US009347387B2

(12) United States Patent
Heintze

(10) Patent No.: US 9,347,387 B2
(45) Date of Patent: May 24, 2016

(54) DEVICE AND METHOD FOR OPERATING A MOTOR VEHICLE

(71) Applicant: Dr. Ing. h.c. F. Porsche Aktiengesellschaft, Stuttgart (DE)

(72) Inventor: Andreas Heintze, Boeblingen (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 218 days.

(21) Appl. No.: 14/277,098

(22) Filed: May 14, 2014

(65) Prior Publication Data
US 2014/0350828 A1 Nov. 27, 2014

(30) Foreign Application Priority Data

May 21, 2013 (DE) .......................... 10 2013 105 151

(51) Int. Cl.
| F02D 29/00 | (2006.01) |
| B60W 30/18 | (2012.01) |
| B60T 17/22 | (2006.01) |
| B60T 7/12 | (2006.01) |
| F02D 41/02 | (2006.01) |
| F02D 41/10 | (2006.01) |
| F02D 11/10 | (2006.01) |
| F02D 29/02 | (2006.01) |
| F02D 41/00 | (2006.01) |
| F02D 17/02 | (2006.01) |
| F02D 37/02 | (2006.01) |

(52) U.S. Cl.
CPC .................. *F02D 29/00* (2013.01); *B60T 7/122* (2013.01); *B60T 17/22* (2013.01); *B60W 30/18018* (2013.01); *F02D 11/105* (2013.01); *F02D 29/02* (2013.01); *F02D 41/021* (2013.01); *F02D 41/10* (2013.01); *B60T 2201/06* (2013.01); *F02D 17/02* (2013.01); *F02D 37/02* (2013.01); *F02D 41/0007* (2013.01); *F02D 41/0087* (2013.01); *F02D 2200/501* (2013.01); *F02D 2250/22* (2013.01)

(58) Field of Classification Search
CPC ......... F02D 29/00; F02D 41/10; F02D 29/02; F02D 11/105; F02D 41/0087; F02D 37/02; F02D 2200/501; B60W 30/18; B60W 30/18018; B60T 7/22; B60T 7/122
See application file for complete search history.

(56) References Cited

U.S. PATENT DOCUMENTS

| 5,518,307 A | * | 5/1996 | Okazaki .............. B60T 8/17616 303/157 |
| 6,626,798 B1 | | 9/2003 | Zillmer et al. |
| 2007/0129873 A1 | | 6/2007 | Bernzen |
| 2009/0143195 A1 | | 6/2009 | Katakura et al. |

(Continued)

FOREIGN PATENT DOCUMENTS

| DE | 19943914 A1 | 3/2001 |
| DE | 102011085096 A1 | 5/2012 |

(Continued)

*Primary Examiner* — Hieu T Vo
(74) *Attorney, Agent, or Firm* — Leydig, Voit & Mayer, Ltd.

(57) ABSTRACT

A device for operating a motor vehicle includes a drive unit configured to drive the motor vehicle in order to make available adjustable starting assistance. A sensing unit is configured to sense a brake pressure of a brake arrangement of the motor vehicle, where the brake pressure is adjustable using a brake pedal. A control unit is configured to set a degree of starting assistance that is made available when the brake pressure, which is sensed during a stationary state of the motor vehicle, exceeds a predefined threshold value.

12 Claims, 2 Drawing Sheets

(56) References Cited

U.S. PATENT DOCUMENTS

2011/0144876 A1 6/2011 Miah
2015/0239450 A1* 8/2015 Yu .................... B60W 10/18
　　　　　　　　　　　　　　　　　　701/70

FOREIGN PATENT DOCUMENTS

| JP | 2009133468 A | 6/2009 |
| JP | 2011143765 A | 7/2011 |

* cited by examiner

DEVICE AND METHOD FOR OPERATING A
MOTOR VEHICLE

CROSS REFERENCE TO RELATED APPLICATIONS

This application claims priority from German Patent Application No. DE 10 2013 105 151.0, filed May 21, 2013, which is hereby incorporated by reference herein its entirety.

FIELD

The present invention relates to a device for operating a motor vehicle, wherein the device has a drive unit which is designed to make available adjustable starting assistance in order to drive the motor vehicle, and has a sensing unit which is designed to sense a brake pressure, which can be adjusted by means of a brake pedal, of a brake arrangement of the motor vehicle.

In addition, the present invention relates to a method for operating a motor vehicle, wherein the motor vehicle has a device with a drive unit which is designed to make available adjustable driving assistance in order to drive the motor vehicle, wherein the method comprises sensing of a brake pressure, adjusted by means of a brake pedal, of a brake arrangement of the motor vehicle.

BACKGROUND

Sports cars and high-power sporty limousines, coupés and SUVs with automatic transmissions (for example convertor transmissions or double clutch transmissions) or automated manual transmissions frequently have what is referred to as a racing start function. This racing start function originates from motor sport and makes it possible to make available starting assistance in order therefore to achieve maximum possible acceleration for imminent starting of the motor vehicle.

However, in known systems the maximum of the achievable acceleration is always made available after the activation of the racing start function. The degree of starting assistance cannot be adapted to the current requirements. Since the starting system is associated, for example, with a high rotational speed, late ignitions and/or injection shut-offs of the drive engine in a preparatory phase of the racing start as the result of the lack of possibility of metering, the actuation of the racing start function involves a high acoustic volume. This can lead to irritation for passers-by, in particular in town centers. Furthermore, in the known systems a complicated and unaccustomed operating sequence for activating the racing start function is often necessary. For example, in this context the brake of the motor vehicle must be activated with a left foot. At the same time, the throttle has to be opened completely with the right foot. The racing start then occurs as result of the brake being released by means of left foot. It is clear from this that the sequence during a racing start deviates greatly from the accustomed operating sequence for accelerating the motor vehicle. In addition, in the known systems it is necessary that when the racing start function is activated driving stability programs of the motor vehicle (for example ESP—Electronic Stability Program, DSC—Dynamic Stability Control) which are possibly present are switched off. However, slightly unstable driving states can therefore occur during the acceleration of the motor vehicle, in particular on a slippery underlying surface.

These abovementioned aspects of such systems conflict with the regular, customer-oriented and everyday use of what is referred to as a racing start function. As result, the functional benefits of such a racing start function is restricted to only a small number of adventurous and particularly experienced drivers.

DE 10 2011 085 096 A1 discloses a vehicle having an internal combustion engine in which the beginning of starting is determined insofar as a vehicle speed sensor indicates that the vehicle is stopped and a brake pressure sensor indicates that a brake pedal of the vehicle is about to be released. In reaction to the beginning of the starting of the vehicle, a controlled unit opens a throttle valve of the internal combustion engine in the direction of a relatively open position. In this context, the speed and the degree of opening of the throttle valve are set as a function of a starting interval, wherein the starting interval characterizes the time between the release of the brake pedal and the depressing of an accelerator pedal.

SUMMARY

In an embodiment, the present invention provides a device for operating a motor vehicle including a drive unit configured to drive the motor vehicle in order to make available adjustable starting assistance. A sensing unit is configured to sense a brake pressure of a brake arrangement of the motor vehicle, where the brake pressure is adjustable using a brake pedal. A control unit is configured to set a degree of starting assistance made available when the brake pressure, which is sensed during a stationary state of the motor vehicle, exceeds a predefined threshold value

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
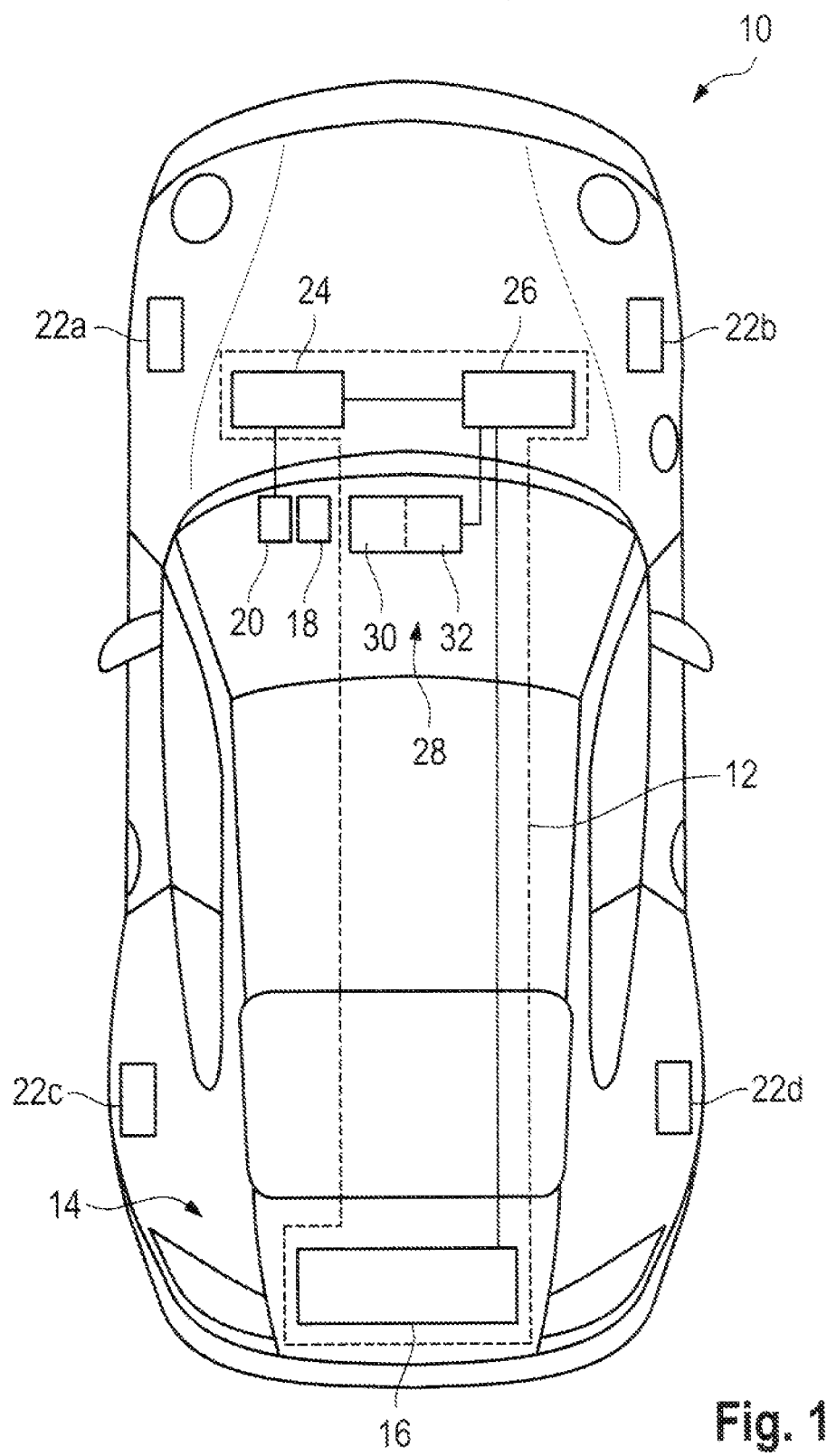
FIG. 1 shows a schematic illustration of a motor vehicle with a device according to an embodiment of the invention.

In embodiment, the present invention provides an improved device and an improved method for operating a motor vehicle, in particular for making available a racing start function which avoids the above-mentioned disadvantages.

In an embodiment, the present invention provides a device for operating a motor vehicle, comprising a drive unit which is designed to drive the motor vehicle in order to make available adjustable starting assistance, a sensing unit which is designed to sense a brake pressure, adjusted by means of a brake pedal, of a brake arrangement of the motor vehicle, and a control unit which is designed to set a degree of starting assistance which can be made available insofar as the break pressure which is sensed during a stationary state of the motor vehicle exceeds a predefined threshold value.

In addition, in an embodiment, the present invention provides a method for operating a motor vehicle, wherein the motor vehicle has a device with a drive unit which is designed to make available adjustable driving assistance for driving the motor vehicle, wherein according to the method a brake pressure, adjusted by means of a brake pedal, of a brake arrangement of the motor vehicle is sensed, and wherein the degree of driving assistance which can be made available is adjusted insofar as the brake pressure which is sensed during a stationary state of the motor vehicle exceeds a predefined threshold value.

Driving assistance is understood here to mean making available an acceleration potential which can be used when accelerating the vehicle from a stationary state.

The degree of driving assistance can be defined according to requirements using the device according to the invention and the method according to the invention. For this purpose, when the vehicle is stationary the brake pressure is sensed while the drive unit remains in the idling mode. The driver of the vehicle can define the degree of driving assistance during the subsequent release of the brake and the simultaneous activation of the accelerator pedal by means of the strength of activation of the brake pedal. In other words, the degree of driving assistance is adjusted as a function of the brake pressure which is sensed in the stationary state of the vehicle. The acoustic volume of the drive unit which is associated with the degree of driving assistance can also be varied according to the driver's wishes.

A simple and ergonomic operating capability of the driving assistance or of the racing start function is ensured through the accustomed operating control sequence of the driving process by means of the brake pedal and accelerator pedal. As a result, incorrect operation of the racing start function can be reduced or even avoided.

The device according to the invention and the method according to the invention also ensure that a customary brake pressure, which is necessary for keeping the vehicle stationary, does not bring about adjustment of driving assistance. This is achieved by defining a threshold value for the brake pressure. Driving assistance is therefore not adjusted until the brake pressure which is sensed in the stationary state of the motor vehicle exceeds the predefined threshold value. This permits a simple and intuitive operating capability of the racing start function. The suitability of such driving systems is therefore increased.

According to one preferred embodiment, the control unit is designed to adjust the degree of driving systems which can be made available in that at least one control parameter of the drive unit is changed.

The acceleration capability of the starting characteristic of the motor vehicle can be influenced very easily by changing one or more control parameters. In this context, the control parameter can be changed to different degrees as a function of the sensed brake pressure. Furthermore, there is the possibility of selecting, as a function of the degree of starting assistance, different control parameters whose value is then changed according to the driving assistance which is adjusted.

In a further preferred embodiment, the drive unit has an internal combustion engine, wherein the control parameter is formed by an idling rotational speed, an ignition angle, a shut-off pattern for fuel injection of the internal combustion engine and/or a charge pressure for a turbo charger of the internal combustion engine.

For example, the torque reserve of the internal combustion engine can be increased by setting a later ignition angle. Furthermore, the driving assistance can be boosted by raising the idling rotational speed. Furthermore, it is possible to make available an additional torque reserve by means of cylinder shut-offs or injection shut-offs. In addition, the acceleration capability of the motor vehicle can be improved by increasing, for example, the charge pressure of a turbo charger which is possibly present.

In a further embodiment, the drive unit is designed to make available at least a portion of the driving assistance which is adjusted insofar as an accelerator pedal of the motor vehicle is activated.

In this embodiment, the driving assistance which is adjusted is called as soon as the brake is released and the accelerator pedal of the motor vehicle is activated. The operator control of the racing start function therefore corresponds to the operating sequence during a conventional acceleration of the vehicle from a stationary state. The convenience of use of starting assistance is consequently increased significantly. The elimination of unaccustomed additional sequences improves customer acceptance.

According to a further embodiment, the drive unit is designed to determine the portion of the set driving assistance as a function of pedal travel of the accelerator pedal.

If the driver releases the brake and subsequently activates the accelerator pedal, the vehicle is accelerated using the starting assistance. If the accelerator pedal is activated as far as a stop (open throttle/kick down), the entire set driving assistance is called and the vehicle is therefore accelerated to a maximum. On the other hand, if the accelerator pedal is activated only over a portion of a maximum possible pedal travel (partial acceleration), only a portion of the set starting assistance is actually made available and therefore the vehicle is accelerated in a correspondingly restrained fashion. During the starting process the driver also has the full decision capability about the driving performance which is actually made available. The acceleration of the vehicle can consequently be adapted at any time to change to ambient conditions (for example passers-by who unexpectedly cross the road). This provides increased safety for the racing start function which is made available.

According to a further embodiment, the control unit is designed to increase the degree of starting assistance which can be made available insofar as the brake pressure which is sensed when the stationary state of the motor vehicle is increased.

In this embodiment, the degree of starting assistance which can be made available is increased insofar as the brake pressure is increased in a range above the predefined threshold value. This measure permits the degree of starting assistance to be set in a way which is compatible with requirements, and therefore permits easy scalability of the racing start function. In this context, the degree of starting assistance can be adjusted as a function of the brake pressure, which is sensed in the stationary state of the motor vehicle, from gentle starting boosting ranging as far as maximum implementation for a catapult-like acceleration process. Furthermore, the selected starting assistance can be increased in the stationary state of the motor vehicle at any time by further boosting the brake pressure by means of the brake pedal. This increases the flexibility of the racing start function which is made available. Furthermore, the driver is therefore always given complete control of the set driving systems.

Furthermore, the driving assistance in this embodiment can be increased continuously or in predefined increments when the brake pressure is raised.

According to a further embodiment, the control unit is designed to reduce the degree of starting assistance which can be made available insofar as the brake pressure gradient of a drop in brake pressure which is sensed in the stationary state of the motor vehicle is lower than or equal to a predefined gradient threshold value.

If, in the stationary state of the vehicle, the driver slowly reduces the brake pressure in the direction of relatively low brake pressure values, the implementation of the preset starting assistance is decreased again in accordance with the new, reduced brake pressure. In this context, the speed of the reduction over the associated brake pressure gradient is evaluated. If the brake pressure is also decreased below the predefined threshold value for the brake pressure, the starting assistance is switched off. The selected degree of starting assistance can therefore be adapted to changed peripheral conditions at any time. This ensures a high level of safety of the device according to the invention.

In a further embodiment, the control unit is designed to keep the degree of starting assistance which is made available constant for a predefined time period insofar as the brake pressure gradient of a drop in brake pressure, which is sensed in the stationary state of the motor vehicle, is higher than the predefined gradient threshold value.

This measure ensures that after prompt release of the brake for the predefined time period the set starting assistance is maintained in the implementation desired by the driver (before the brake was released). This ensures that even in the case of delayed activation of the accelerator pedal the entire driving assistance is available for the subsequent acceleration process. The speed of activation of the brake pedal is in turn sensed by means of the associated brake pressure gradient. In addition, the predefined time period can be a settable time interval which is predefined by the driver of the vehicle.

According to a further embodiment, the device has a starting control device, wherein in a deactivated state of the starting control device the making available of the driving assistance is prevented, and wherein in an activated state of the starting control device the making available of the starting assistance is enabled.

By using the starting control device, the driver can select whether or not in principle if he wishes to use the starting assistance functionality. In the deactivated state, the starting assistance is generally switched off independently of a brake pressure which is exerted. Driving assistance can be set as a function of the brake pressure sensed (in the stationary state of the vehicle) only when the racing start function is activated by means of the starting control device. If the starting control device is actuated, it remains in the activated state until the racing start function is deactivated again by the driver. Furthermore, there is the possibility of applying activation of the starting control device only to the current driving cycle. In such an embodiment, the starting control device is activated on a standard basis when the motor vehicle is restarted (that is to say when a new driving cycle begins).

According to a further embodiment, the starting control device has a switch and/or a manual entry in a software-based vehicle control unit of the motor vehicle.

By means of the switch, a direct and rapid access to the racing start function can be made available. The vehicle control unit can form, for example, part of a driving information system. The racing start function can be implemented cost-effectively by means of an additional menu entry in the driver information system. Moreover, the clarity of the operator control can therefore be increased since it is possible to dispense with the arrangement of an additional switch in the region of the vehicle console.

According to a further embodiment, the device also has a vehicle information unit which is designed to represent acoustically and/or visually the degree of starting assistance which can be made available.

The driver information unit can form, for example, part of the driver information system. Alternatively or additionally, the vehicle information unit can also be implemented by means of a separate display unit and/or by means of loudspeakers. The driver is informed about the status or the degree of starting assistance at any time.

In the device according to the invention or the method according to the invention the full functionality of the stability systems present in the vehicle (for example ESP, DST etc.) can advantageously be used. As a result, the safety when applying such a racing start function can be increased. Owing to the activated stability systems, the racing start function can also be applied easily and safely for a driver with a normal amount of experience. This in turn provides high customer benefit and a high level of acceptance.

In a further embodiment, the stability systems of the motor vehicle can be activated starting from a predetermined degree of starting assistance. This permits even more rapid acceleration of the vehicle, in particular when there is a high degree of starting assistance.

By using a driver information system, the driver can be informed about the switching off of the stability systems.

According to a further embodiment, the control unit is coupled to a control device of the driving stability system.

Insofar as the motor vehicle has a convertor transmission, the control unit can initiate a braking intervention of the driving stability system as a function of the degree of starting assistance in order to make available a constant creeping torque (independently of the degree of said starting assistance). Owing to this measure, the application comfort is significantly increased.

Of course, the features, properties and advantages of the device according to the invention can also apply or be applied to the method according to the invention.

Exemplary embodiments of the invention are illustrated in the drawing and will be explained in more detail in the following description. In the drawing:

FIG. 1 shows a motor vehicle 10 with a device 12 according to the invention which is designed to make available adjustable starting assistance or what is referred to as a racing start function. For this purpose, the device 12 has a drive unit 14 with an internal combustion engine 16 and a double clutch transmission (not illustrated in more detail in FIG. 1). Of course, the drive unit 14 can also have any other automatic transmission such as, for example, a convertor transmission or an automated manual transmission.

In a vehicle passenger compartment the motor vehicle 10 has an accelerator pedal 18 and a brake pedal 20. The brake pedal 20 is coupled to a brake arrangement 22, which has, for example, disc brakes 22a to 22b. In addition, the brake arrangement 22 can have hydraulic lines and hydraulic actuators. A fluid is conducted in the hydraulic lines in order to activate the disc brakes 22a to 22b by means of the hydraulic actuators insofar as the brake pedal 20 is activated.

The device 12 has a sensing unit 24 which is designed to sense a brake pressure, which has been set by means of the brake pedal 20, of the brake arrangement 22.

In addition, the device 12 has a control unit 26 which is coupled to the sensing unit 24 and to the internal combustion engine 16. In an alternative embodiment, the control unit 26 can also be coupled to the internal combustion engine 16 via a separate engine control device.

Furthermore, the device 12 has a driver information system 28 which is arranged in the vehicle passenger compartment and which has in turn a vehicle control unit 30 and a vehicle information unit 32. For example settings in the control unit 26 can be made by means of the vehicle control unit 30. The vehicle information unit 32 serves to display relevant data of the control unit 26.

If the driver of the motor vehicle 10 would like to use the racing start function or the starting assistance during the current driving cycle, this functionality can be activated using a software menu of the vehicle control unit 30. Alternatively, a switch with which the starting assistance can be activated can also be arranged in the vehicle passenger compartment.

If the racing start function is activated and the motor vehicle 10 is in the stationary state, the control unit 26 evaluates the brake pressure sensed by the sensing unit 24 and sets a degree of starting assistance at the internal combustion engine 16 as a function of this brake pressure. To this, the control unit 26 changes at least one control parameter of the internal combustion engine 16. For example, the control unit 26 can raise an idling rotational speed of the internal combustion engine 16 and/or set a later ignition angle for the internal combustion engine 16. The degree of the currently set starting assistance is also passed onto the vehicle information unit 32 by the control unit 26. The set starting assistance for the driver is displayed using the vehicle information unit 32.

If the driver releases the brake pedal 20 and subsequently activates the accelerator pedal 18, the set starting assistance is made available by the internal combustion engine 16. As a result, the motor vehicle 10 is accelerated in accordance with the starting system which is selected by the driver and has been set by means of the brake pressure. The device 12 therefore makes available a racing start function which is easy to operate and can be metered by the driver.

Figure 2:
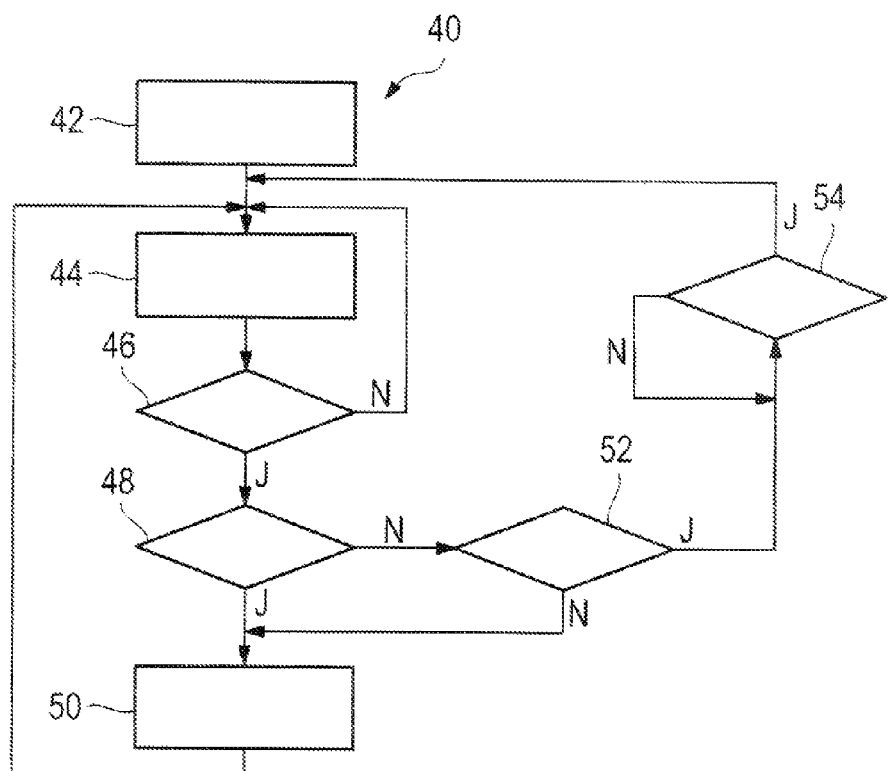
FIG. 2 shows a diagram explaining a method according to an embodiment of the invention during a preparatory phase.
Figure 3:
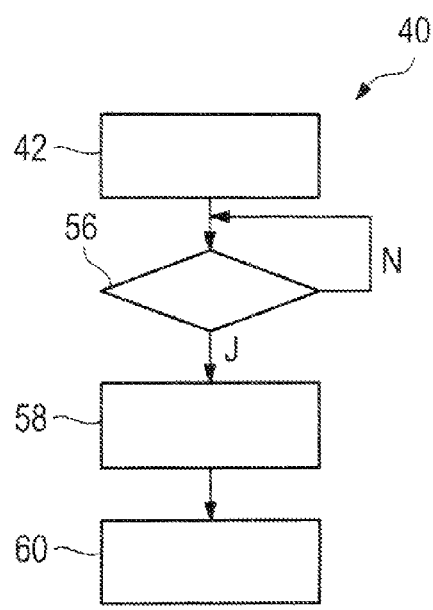
FIG. 3 shows a diagram explaining the method during a triggering phase.

FIGS. 2 and 3 show diagrams explaining a method 40 according to the invention which serves to operate a motor vehicle 10 and make available a racing start function/starting assistance. In this context, FIG. 2 illustrates the method 40 during a preparatory/waiting phase, and FIG. 3 illustrates the method 40 during what is referred to as a triggering phase. A preparatory/waiting phase is to be understood here as being a time period in which the motor vehicle 10 is in a stationary state and in which preparatory measures for an imminent starting process of the motor vehicle 10 can be taken. In contrast, the driven phase denotes a time period in which the set starting assistance is called, this is to say in which the motor vehicle 10 is accelerated from the stationary state.

In a step 42, the racing start function/starting assistance is actuated, for example when travel starts. This takes place in the present exemplary embodiment in that the driver selects the corresponding software menu in the vehicle control unit 30 and activates the racing start function. The starting assistance function for this driving cycle is then available until it is deactivated again by means of the vehicle control unit 30. When the motor vehicle 10 restarts, the racing start function is deactivated on a standard basis. In an alternative embodiment, activation of the racing start function can also be stored for future restarts of the motor vehicle 10.

In a step 44, the brake pressure is sensed in the stationary state of the motor vehicle 10 by means of the sensing unit 24.

In a step 46 it is subsequently checked whether the sensed brake pressure exceeds a predefined threshold value. By means of the threshold value it is possible to prevent an unaccustomed brake pressure which is sufficient to keep the motor 10 stationary and is usually applied by the driver from bringing about adjustment of starting assistance. A specific degree of starting assistance is only set at a brake pressure which exceeds the predefined threshold value.

If the sensed brake pressure is above the threshold value, in a step 48 it is checked whether the brake pressure has increased compared to previously sensed values of the brake pressure.

If there is an increase in the brake pressure, in a step 50 corresponding to starting assistance is sensed as a function of the brake pressure. For example, a weak implementation of the starting assistance can be set by increasing the torque reserve of the internal combustion engine 16 with late ignition angles. This merely brings about a slightly changed running noise of the internal combustion engine 16 and accordingly prevents irritation for the persons located in the vicinity.

The method 40 subsequently returns again to the step 44, and instantaneous brake pressure is sensed by means of the sensing unit 24.

If the brake pressure is increased further by the driver, this brings about a continuous, stepless increase in the degree of starting assistance. This goes hand in hand with a continuously increased acceleration capability of the motor vehicle 10. In order to adjust the degree of driving assistance, the control unit 26 changes control parameters of the internal combustion engine 16. It is therefore possible not only to adjust a later ignition angle but also to raise the idling rotational speed of the internal combustion engine 16. However, the increased idling rotational speed makes the starting assistance clearly perceptible for persons located in the vicinity.

When the brake pressure is increased further, the starting assistance is boosted by further raising the idling rotational speed, by cylinder shut-offs and/or frequent injection shut-offs. A high degree of starting assistance is therefore associated with an acoustically highly striking internal and external effect. The higher the setting for the degree of starting assistance, the quicker the vehicle 10 can be accelerated in the subsequent triggering phase.

In the waiting/preparatory phase, the driver can re-adjust the degree of starting assistance by boosting the brake pressure at any time in a way which is compatible with the requirements and situation. For example, the starting assistance can be correspondingly boosted if there is no relatively large gap in view in main road traffic which is crossing the vehicle's path, with the result that a very precise and highly agile cutting-in process is necessary.

In an analogous fashion, the driver of the motor vehicle 10 can reduce the degree of starting assistance which can be made available during the waiting/preparatory phase at any time in a way which is compatible with the requirements and situation in that the driver slowly reduces the brake pressure by means of the brake pedal 20. In this context, the reduction in the brake pressure is also detected in the step 48.

If the brake pressure is reduced, a brake pressure gradient of the drop in brake pressure is determined in a step 52. Insofar as the specific brake pressure gradient is lower than or equal to a predefined gradient threshold value, in the step 50 the degree of starting assistance which can be made available is reduced. The possibility of reducing the previously set starting assistance again (for example in the case of changed peripheral conditions, passers-by appearing unexpectedly on the sidewalk etc.). In the waiting/preparatory phase the driver therefore always has complete control over the degree of set starting assistance.

If it is detected in the step 52 that the brake pressure gradient of the drop in brake pressure is greater than the predefined gradient threshold value, it is assumed that the driver has promptly released the brake 20 in order subsequently to initiate an acceleration process of the motor vehicle 10 by means of the accelerator pedal 18. For this reason, the degree of starting assistance which can be made available is kept constant for a predefined time period (which starts from the time of release of the brake pedal 20). In other words, the metering of the starting assistance which is desired by the driver is stored for the predefined time period. As a result, it is ensured that even in the case of delayed activation of the accelerator pedal 18 the full starting assistance is available. In step 54 it is checked whether the predefined time period has already expired.

After the predefined time period has expired, the starting assistance is adjusted according to steps 44 to 52.

FIG. 3 shows a diagram illustrating the method 40 during the triggering phase. The basic precondition for making available starting assistance is in turn the activation of the racing start function in the step 42.

In a step 56 it is checked whether the brake pedal 20 has been released and the throttle pedal 18 is activated.

Insofar as these conditions are met, it is assumed that the motor vehicle 10 is to be accelerated. For this purpose, the deflection of the accelerator pedal 18 is sensed in a step 58.

In a step 60 at least a portion of the previously set starting assistance is made available as a function of the sensed deflection of the accelerator pedal. The greater the deflection of the accelerator pedal, the greater the portion of the previously set starting assistance which is actually made available. Consequently, in the event of the throttle being opened fully (kick down), the entire starting assistance which is set in the preparatory phase is utilized. If, on the other hand, the driver activates the accelerator pedal 18 only partially (partial opening of the throttle), only a correspondingly smaller portion of the starting assistance which is set in the preparatory phase is also made available. This gives rise to correspondingly more restrained starting acceleration of the vehicle 10. The driver therefore also has full control of the desired starting performance even in the triggering phase.

The device 12 according to the invention and the method 40 according to the invention can also be advantageously used in relatively small-volume turbo engines since they suffer from weakness in terms of starting without assisting measures. This is caused by the delay until a turbo charger of the drive unit 14 is set to the desired rotational speed. When the device 12 according to the invention is used, the control unit 26 can raise the rotational speed or the charge pressure of the turbo charger as a function of the brake pressure which is sensed by the sensing unit 24. This gives rise to an increased acceleration capability and a spontaneous response behavior of the internal combustion engine 16 during a subsequent acceleration process.

The customer benefit of such a racing start function is therefore increased even in everyday traffic situations. In addition, the advantages of the starting assistance are made available by the easy handling even for drivers with a normal level of experience.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A device for operating a motor vehicle, comprising:
a drive unit configured to drive the motor vehicle in order to make available adjustable starting assistance;
a sensing unit configured to sense a brake pressure of a brake arrangement of the motor vehicle, the brake pressure being adjustable using a brake pedal; and
a control unit configured to set a degree of starting assistance made available when the brake pressure, which is sensed during a stationary state of the motor vehicle, exceeds a predefined threshold value.

2. The device as recited in claim 1, wherein the control unit is configured to set the degree of driving assistance that is made available by changing at least one control parameter of the drive unit.

3. The device as recited in claim 2, wherein the drive unit includes an internal combustion engine, and wherein the control parameter includes an idling rotational speed, an ignition angle, a shut-off pattern for a fuel injection of the internal combustion engine and/or a charge pressure for a turbo charger of the internal combustion engine.

4. The device as recited in claim 1, wherein the drive unit is configured to make available at least part of the adjusted starting assistance by activating an accelerator pedal of the motor vehicle.

5. The device as recited in claim 4, wherein the drive unit is configured to determine the part of the adjusted starting assistance as a function of a pedal travel of the accelerator pedal.

6. The device as recited in claim 1, wherein the control unit is configured to increase the degree of starting assistance that is made available based on the brake pressure, which is sensed in the stationary state of the motor vehicle, being increased.

7. The device as recited in claim 1, wherein the control unit is configured to reduce the degree of starting assistance that is made available based on the brake pressure gradient of a drop in brake pressure, which is sensed in the stationary state of the motor vehicle, being less than or equal to a predefined gradient threshold value.

8. The device as recited in claim 1, wherein the control unit is designed to keep the degree of driving assistance which can be made available constant for a predefined time period insofar as the brake pressure gradient of a drop in brake pressure which is sensed in the stationary state of the motor vehicle higher than the predefined gradient threshold value.

9. The device as recited in claim 1, wherein the device has a starting control device, wherein in the deactivated state of the starting control device the provision of the starting assistance is prevented, and wherein in an activated state of the starting control device the provision of the starting assistance is enabled.

10. The device as recited in claim 9, wherein the starting control device has a switch and/or a menu entry in a software-based vehicle control unit of the motor vehicle.

11. The device as recited in claim 1, wherein the device also has a vehicle information unit which is configured to represent acoustically and/or visually the degree of starting assistance which can be made available.

12. A method for operating a motor vehicle, having a device with a drive unit configured to make available an adjustable starting assistance for driving the motor vehicle, the method comprising:
    sensing a brake pressure, adjusted using a brake pedal, of a brake arrangement of the motor vehicle; and
    adjusting a degree of the starting assistance when the brake pressure, which is sensed during a stationary state of the motor vehicle, exceeds a predefined threshold value.

* * * * *